United States Patent
Abma et al.

[11] Patent Number: 6,019,901
[45] Date of Patent: Feb. 1, 2000

[54] PROCESS FOR REMOVING POLYAMINE CHELATING AGENTS FORM AQUEOUS SOLUTIONS

[75] Inventors: Wiebe Ruurd Abma, De Wilgen; Cees Jan Nico Buisman, Harich, both of Netherlands

[73] Assignee: Paques Bio Systems B.V., Balk, Netherlands

[21] Appl. No.: 09/276,938

[22] Filed: Mar. 26, 1999

[30] Foreign Application Priority Data

Mar. 26, 1998 [EP] European Pat. Off. .............. 98200950

[51] Int. Cl.[7] .................................. C02F 9/00; C02F 3/12
[52] U.S. Cl. .................... 210/620; 210/631; 210/757; 210/908
[58] Field of Search ...................... 210/601–631, 210/649, 650, 757, 758, 765, 908–910

[56] References Cited

U.S. PATENT DOCUMENTS

| | | | |
|---|---|---|---|
| 4,530,963 | 7/1985 | DeVoe et al. | 210/615 |
| 4,614,587 | 9/1986 | Andersson et al. | 210/603 |
| 5,082,573 | 1/1992 | Goldstein et al. | 210/757 |
| 5,534,148 | 7/1996 | Suzuki et al. | 210/631 |

FOREIGN PATENT DOCUMENTS

| | | |
|---|---|---|
| 8-052490 | 2/1996 | Japan . |
| WO 96/24434 | 8/1996 | WIPO . |

*Primary Examiner*—Thomas G. Wyse
*Attorney, Agent, or Firm*—Young & Thompson

[57] ABSTRACT

The invention provides a process for removing polyamine chelating agents from aqueous solutions comprising oxidising the chelating agents with oxygen in the presence of an equivalent amount of a transition metal such as iron, followed by biologically reducing the chelates in the presence of an electron donor, and optionally by membrane filtration. The biological reduction is carried out with denitrifying and/or sulphate-reducing bacteria.

7 Claims, 1 Drawing Sheet

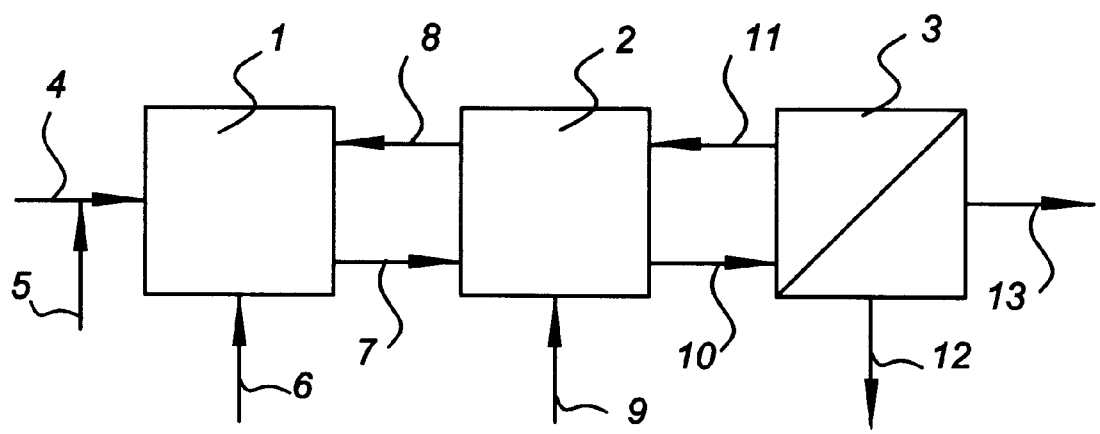

PROCESS FOR REMOVING POLYAMINE CHELATING AGENTS FORM AQUEOUS SOLUTIONS

The invention relates to a process for removing polyamine chelating agents from aqueous solutions.

Polyamine chelating compounds such as EDTA (ethylenediaminetetraacetic acid) and DTPA (diethylenetriaminepentaacetic acid) are frequently used for binding heavy metals, e.g. for the bleaching process in the textile, paper and pulp industry, in graphic processes, cleaning compositions, agriculture, polymer production, leather industry, mining and oil industry and gas sweetening (sulphide removal). These chelating agents have a drawback in that they may not be discharged onto surface waters, as they keep heavy metals dissolved and as they are themselves poorly biodegradable in common aerobic or anaerobic water treatment plants.

It was found now that such polyamine chelating agents can be degraded by reaction with a transition metal such as iron, and oxidation of the complex formed with oxygen, followed by reduction by denitrifying or sulphate-reducing bacteria. The process according to the invention is defined in the appending claims.

Transition metals that used to form a complex with the chelating agent include iron, manganese, copper, zinc, nickel, aluminium, etc. For environmental and economical reasons iron is preferred. The metals are added in amounts which are about equivalent (or equimolar if the chelate is a 1:1 clelate) with those of the chelating agents ("about" being understood here as ±40%, especially ±20%).

Examples of chelating agents arc polyamincs such as ethylenediamine, diethylenetriamine, triethylenetetraamine, hexamethylenetetraamine and 1, 4, 7-triazonane and their N-alkylated analogues, and especially polyamines which contain one or more hydroxymethyl, hydroxyethyl groups, carboxymethyl and/or phosphonomethyl groups. Examples thereof are N-(2-hydroxyethyl)ethylenediamine-triacetic acid (HEDTA), EDTA, DTPA, propylenediaminetetraacetic acid (PDTA), iminodiacetic acid, nitrilotriacetic acid (NTA), diethylenetriaminepentamethylenephosphonic acid (DTPMP), and salts thereof.

The biological reduction usually requires an electron donor. Hydrogen may be used as an electron donor, but organic electron donors, for example methanol, ethanol, fatty acids or organic waste may also be used. Degradation products of the carboxy-polyamines can also serve as electron donors.

The biomass required for the biological reduction contains known nitrate-reducing bacteria such as the genera Pseudomonas, Hyphomicrobium, Bacillus, Paracoccus, Thiobacillus, Thiomicrospira, Thermotrix, Alcaligenes, Bradyrhizobium or Nitrosomonas, or sulphate-reducing bacteria such as the genera Desulfovibrio, Desulfotomaculum, Desulfomonas, Desulfolobus, Desulfobacter, Desulfococcus, Desulfonema, Desulfosarcina, Desulfobacterium or Desulforomas. Other genera may be equally suitable.

It is preferred that a semipermeable membrane capable of retaining the chelate in the system is used, so that the removal efficiency for the chelating agent is further increased. The membrane may be placed after the oxidation step or, preferably after the reduction step. Common inorganic or, preferably, polymeric membrane materials may be used.

The process of the invention can be performed at atmospheric pressure, but also at reduced or increased pressure. The temperature will usually be between 20 and 70° C., but higher temperatures arc feasible when the appropriate extremophilic bacteria are used, such as those related to the genus Desulfotomaculum as disclosed in WO 98/02524. The pH of the process will be between 2 and 11, preferably between 6 and 9. Oxygen can be added as such, or as air.

The process of the invention can be carried out in separate reactors or in a single reactor. For example, the process can be carried out in three stages as depicted in FIG. 1. Reactor 1 of FIG. 1 is an oxidation reactor fed with waste water containing chelating agents (4), transition metal (5) and oxygen (6). In reactor (1), the chelating agents are complexed with metal and the complexes are degraded by oxygen. Reactor (2) is a bioreactor wherein the metal and the metal complexes issued from the oxidation reactor through (7) are biologically reduced. The reduced metal is returned through (8) to the oxidation reactor (1). An electron donor may be fed through (9). Separator (3) separates the metal complexes originating from the bioreactor through (10) from the purified waste water (12). The complexes are returned through (11). Separator (3) may contain a membrane filtration unit and/or further separator units. A surplus of metals may be separated by settling or micro-filtration and carried off through (13). The process can also be carried out in two stages, wherein either oxidation reactor (1) and bioreactor (2) of FIG. 1 are combined to a single reactor, or bioreactor (2) and membrane filtration unit (3) are combined to a single unit (membrane bioreactor). If a combined oxidation reactor/-bioreactor is used, a reductive excess is maintained, e.g. by introducing a limiting amount of oxygen with respect to the redox control. This ensures low oxygen levels in the bulk of the liquid and thus maintenance of the denitrifying/sulphate-reducing bacteria. The process can also be carried out in a single installation wherein aeration, biological reduction and membrane filtration are combined.

EXAMPLE

In a test facility consisting of an oxidation reactor of 5 $dm^3$ and a bioreactor of 5 $dm^3$, a solution containing 15 $g/dm^3$ of EDTA was degraded. An equimolar amount of iron was added. The solution was continuously recycled over the oxidation reactor and the bioreactor, with a flow of 5 $dm^3/h$. The system was operated at a temperature of 50° C. and a pH of 7. Ethanol was dosed as an electron donor. In two days the EDTA concentration was reduced to 50%.

We claim:

1. A process for removing polyamine chelating agents from aqueous solutions comprising oxidising the chelating agents with oxygen in the presence of an about equivalent amount of a transition metal followed by biologically reducing the chelates in the presence of an electron donor.

2. A process according to claim 1, in which the transition metal is iron.

3. A process according to claim 1, in which the electron donor comprises hydrogen, methanol, ethanol, fatty acids, a COD-containing stream, or a residue of the polyamine chelating agent.

4. A process according to claim 1, in which the biological reduction is carried out with denitrifying and/or sulphate-reducing bacteria.

5. A process according to claim 1, in which the oxidation and the biological reduction is carried out in the same reactor.

6. A process according to claim 1, in which the effluent from the oxidation step and/or the biological reduction step is passed through a semipermeable membrane.

7. A process according to claim 6, in which the biological reduction step is performed in a reactor equipped with a semipermeable membrane.

* * * * *